(12) United States Patent
Berzon

(10) Patent No.: US 11,378,720 B2
(45) Date of Patent: Jul. 5, 2022

(54) ADHESION PRIMER FOR LAMINATE IN CAST LENSES

(71) Applicant: ESSILOR INTERNATIONAL, Charenton-le-Pont (FR)

(72) Inventor: Ronald A. Berzon, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 191 days.

(21) Appl. No.: 16/331,425

(22) PCT Filed: Sep. 19, 2016

(86) PCT No.: PCT/IB2016/055593
§ 371 (c)(1),
(2) Date: Mar. 7, 2019

(87) PCT Pub. No.: WO2018/051173
PCT Pub. Date: Mar. 22, 2018

(65) Prior Publication Data
US 2019/0219735 A1 Jul. 18, 2019

(51) Int. Cl.
*G02B 1/04* (2006.01)
*G02B 1/14* (2015.01)
(Continued)

(52) U.S. Cl.
CPC .......... *G02B 1/041* (2013.01); *B29D 11/0073* (2013.01); *B29D 11/00644* (2013.01);
(Continued)

(58) Field of Classification Search
CPC .......... G02B 1/041; G02B 1/14; B32B 23/08; B32B 2255/10; B32B 2255/26; B32B 2307/42; C09D 133/14; G02C 7/12
(Continued)

(56) References Cited

U.S. PATENT DOCUMENTS 5,272,230 A * 12/1993 Edwards ............... C08F 265/06
526/213
5,322,861 A * 6/1994 Tsuge .................... C08G 18/10
522/90
(Continued)

FOREIGN PATENT DOCUMENTS

CN 1484664 3/2004
CN 101688928 3/2010
(Continued)

OTHER PUBLICATIONS

Ciba Specialty Chemicals, "Ciba (R) Darocur (R) 1173", Sep. 4, 2001, p. 3 (Year: 2001).*
(Continued)

*Primary Examiner* — Callie E Shosho
*Assistant Examiner* — Steven A Rice
(74) *Attorney, Agent, or Firm* — Norton Rose Fulbright US LLP

(57) ABSTRACT

Embodiments of the disclosure relate to a primer composition for increasing the adhesion of a polarizing film laminate to a cast-polymerized lens. The primer includes an acrylic polymer, polyurethane acrylate oligomer, a solvent, a UV curing agent, and a monomer which promotes adhesion to a cast-polymerized lens.

5 Claims, 1 Drawing Sheet

(51) Int. Cl.
B32B 23/08 (2006.01)
C09D 133/14 (2006.01)
G02C 7/12 (2006.01)
B29D 11/00 (2006.01)

(52) U.S. Cl.
CPC ............ B32B 23/08 (2013.01); C09D 133/14 (2013.01); G02B 1/14 (2015.01); B29D 11/00634 (2013.01); B32B 2255/10 (2013.01); B32B 2255/26 (2013.01); B32B 2307/42 (2013.01); G02C 7/12 (2013.01)

(58) Field of Classification Search
USPC ...................................................... 428/423.1
See application file for complete search history.

(56) References Cited

U.S. PATENT DOCUMENTS

| | | | |
|---|---|---|---|
| 6,503,631 | B1 | 1/2003 | Faverolle et al. |
| 6,572,794 | B1* | 6/2003 | Berzon ..................... C08F 2/46 |
| | | | 264/492 |
| 2005/0168690 | A1* | 8/2005 | Kawai ...................... G02C 7/12 |
| | | | 351/159.6 |
| 2006/0001959 | A1* | 1/2006 | Senoue ................. G02B 5/0833 |
| | | | 359/449 |
| 2007/0224415 | A1* | 9/2007 | Satake .................... B32B 27/36 |
| | | | 428/341 |
| 2009/0283926 | A1 | 11/2009 | Chiu et al. |
| 2010/0189888 | A1 | 7/2010 | Mori |
| 2012/0236255 | A1 | 9/2012 | Jiang et al. |
| 2012/0308798 | A1* | 12/2012 | Ryu ..................... G02B 5/3033 |
| | | | 428/220 |
| 2015/0301253 | A1 | 10/2015 | Henry |
| 2016/0185083 | A1* | 6/2016 | Yasui .................... B32B 27/304 |
| | | | 428/1.55 |

FOREIGN PATENT DOCUMENTS

| | | |
|---|---|---|
| CN | 202393932 | 8/2012 |
| CN | 103842854 | 6/2014 |
| JP | 2007284485 A * | 11/2007 |
| WO | WO 2015/121305 | 8/2015 |

OTHER PUBLICATIONS

Machine translation of JP 2007-284485 A (Year: 2007).*
Anonymous, "Sartomer", 2017, Retrieved from the Internet URL: <https://americas.sartomer/techlitdetail.asp?plid=2&sgid=14&prid=CN965 >.
International Search Report and Written Opinion issued in International Patent Application No. PCT/IB2016/055593, dated May 19, 2017.
First Office Action issued in Corresponding Chinese Application No. 201680089375.7, dated Mar. 23, 2020 (English Translation provided).
Second Office Action issued in Corresponding Chinese Application No. 201680089375.7, dated Sep. 16, 2020 (English Translation provided).

* cited by examiner

ADHESION PRIMER FOR LAMINATE IN CAST LENSES

CROSS-REFERENCE TO RELATED APPLICATIONS

This application is a national phase application under 35 U.S.C. § 371 of International Application No. PCT/IB2016/055593 filed 19 Sep. 2016, the entire contents of which is specifically incorporated by reference herein without disclaimer.

FIELD OF THE INVENTION

The present disclosure relates to the field of ophthalmic lenses, including polarized ophthalmic lenses for spectacles and sunglasses.

BACKGROUND

Light can be envisioned as a collection of independent waves, each of which oscillates in a different given direction and plane. Most light is made up of waves whose oscillations are randomly-oriented and are not aligned in a particular plane. Plane polarized light, or polarized light, is made of light waves whose oscillations are aligned in a particular plane. Sunlight is not polarized, as the light wave oscillations are randomly distributed and not aligned. Reflected light, or glare, that is reflected from surfaces such as a body of water or the hood of a car becomes substantially polarized.

Polarized lenses include a polarizing filter that allows sunglasses and other optical articles to selectively prevent most light from passing through. Polarizing filters allow only light waves oscillating in a particular plane to pass through, while blocking light waves that oscillate in all other planes.

One of the problems associated with polarized lenses is delamination of the polarizing structure from the lens casting material. This can occur during the manufacturing process or during the finishing process. During the manufacturing process, it is highly desirable to develop some level of connectivity to the casting monomer. A strong adhesive bond will help to maximize production yields and reduce product costs. During the finishing process, it is highly desirable to have some level of connectivity to the cast resin. Lens finishing processing steps include lens blocking, cribbing, back curve generation, back curve fining and polishing, lens edging, and deblocking. These processing steps can impart a high level of stress on a lens and can cause delamination of a polar element. It is essential that no delamination occurs during lens processing.

Current cast CR39 polarizing lenses are manufactured using fragile polyvinyl alcohol (PVA) polarizing films with a thickness of approximately 30 μm. These thin polarizing films are susceptible to damage during handling. During the production of polarized lenses, many manual-handling steps are required, which increases the potential for damage.

PVA films may be laminated within more durable films, such as triacetyl cellulose (TAC). A more robust TAC/PVA/TAC polarizing element provides improved handling durability over a single-layer of PVA film. A primer is applied onto the polarizing laminate for good adhesion in cast CR39 lenses, however, current industrial primers damage the optical quality of the TAC polarizing laminate and do not provide adequate adhesion.

Despite advancements in the field of polarizing film adhesive primers, there is a need for primers that offer improved adhesion. Such a primer will enable the production of robust polarizing elements that withstand aggressive surfacing and edging adhesion tests, thereby leading to improved production yields and productivity.

SUMMARY

Disclosed herein is a primer that provides robust adhesion of a functional laminate to a substrate. The primer is particularly useful for providing adhesion between a TAC-based polarizing laminate in a cast CR39 optical element. The primer is designed to provide a level of penetration into the surface of a TAC layer, or other laminate layer, with the assistance of a suitable solvent or solvent blend. Penetration of the primer into the TAC layer surface contributes to the primer's exceptional adhesive properties.

In some aspects, the primer comprises a reactive monomer which compatibilizes the primer composition with a casting monomer. In some aspects, the casting monomer is allyl diglycol carbonate. The primer reactive monomer may react with the casting monomer to provide a strong bond between the cast polymer and the polarizing laminate. In some aspects, the primer is applied onto one or both sides of a polarizing laminate, dried, UV cured, then cast in a casting monomer formulation.

According to a first aspect, a cast-polymerized lens comprising a functional laminate is provided. In some embodiments, the functional laminate comprises a thermoplastic film layer attached to one or both sides of a functional layer. In some aspects, the functional layer is a polarizing layer. In some aspects, a primer coating is deposited onto one or both external surfaces of the functional laminate. In some aspects, the primer coating comprises at least one acrylic polymer, at least one urethane acrylate oligomer, at least one initiator, at least one reactive monomer capable of reacting with a lens casting monomer, and a solvent. In other aspects, the primer coating comprises at least one acrylic polymer, at least one initiator, at least one reactive monomer capable of reacting with a lens casting monomer, and a solvent. In further embodiments, the primer coating comprises at least one urethane acrylate oligomer, at least one initiator, at least one reactive monomer capable of reacting with a lens casting monomer, and a solvent.

In some embodiments, the at least one acrylic polymer is present in an amount ranging from about 1 to about 30%. In some aspects, the at least one urethane acrylate oligomer is present in an amount ranging from about 1 to about 30%. In some embodiments, the at least one reactive monomer capable of reacting with a lens casting monomer is present in an amount ranging from about 0.5 to about 15%. In some aspects, the at least one initiator is present in an amount ranging from about 0.1 to about 5.0%. In some aspects, the at least one solvent is present in an amount ranging from about 50 to about 95%.

In some embodiments, the at least one acrylic polymer may be a mixture of acrylic polymers. In some embodiments, the at least one acrylic polymer is an acrylic copolymer. In some embodiments, the primer coating acrylic polymer has a molecular weight ranging from about 10,000 to about 100,000 g/mol. In some embodiments, the primer coating urethane acrylate oligomer has a molecular weight ranging from about 10,000 to about 30,000 g/mol. In some aspects, the primer coating urethane acrylate monomer has a degree of unsaturation of 1 or more, and preferably 2. In some embodiments, the primer coating initiator is a thermal or UV initiator.

In some aspects, the reactive monomer is the same as a monomer of the cast-polymerized lens polymer. In other aspects, the reactive monomer is different than a monomer of the cast-polymerized lens polymer. In some embodiments, the reactive monomer comprises a reactive group selected from the group consisting of allyl, vinyl, acrylic, thiol, isocyanate, epoxy, and amine. In some aspects, the reactive group functionality on the reactive monomer is 1 or more, and preferably at least 2.

In some aspects, the primer coating solvent may be a ketone solvent or an acetate solvent. In some aspects, the ketone solvent is selected from the group consisting of acetone, methyl ethyl ketone cyclopentanone, cyclohexanone, and combinations thereof. In some aspects, the acetate solvent is ethyl acetate. Combinations of ketone solvents, acetate solvents, or ketone and acetate solvents may be employed in the primer coating.

In some embodiments, the ophthalmic lens functional laminate is a polarizing laminate. The polarizing laminate may comprise a PVA polarizing layer, or other polarizing layers known to those of skill in the art. The functional laminate may comprise one or more thermoplastic layers. The thermoplastic layers may be the same material, or they may be made of different materials. In some embodiments, the functional laminate thermoplastic film layer comprises TAC. In some aspects, the functional laminate is a TAC-PVA-TAC laminate.

Any embodiment of any of the disclosed compositions and/or methods can consist of or consist essentially of—rather than comprise/include/contain/have—any of the described elements and/or features and/or steps. Thus, in any of the claims, the term "consisting of" or "consisting essentially of" can be substituted for any of the open-ended linking verbs recited above, in order to change the scope of a given claim from what it would otherwise be using the open-ended linking verb.

The term "substantially" and its variations are defined as being largely but not necessarily wholly what is specified as understood by one of ordinary skill in the art, and in one non-limiting embodiment substantially refers to ranges within 10%, within 5%, within 1%, or within 0.5%.

"Analogue" and "analog," when referring to a compound, refers to a modified compound wherein one or more atoms have been substituted by other atoms, or wherein one or more atoms have been deleted from the compound, or wherein one or more atoms have been added to the compound, or any combination of such modifications. Such addition, deletion or substitution of atoms can take place at any point, or multiple points, along the primary structure comprising the compound.

"Derivative," in relation to a parent compound, refers to a chemically modified parent compound or an analogue thereof, wherein at least one substituent is not present in the parent compound or an analogue thereof. One such non-limiting example is a parent compound which has been covalently modified. Typical modifications are amides, carbohydrates, alkyl groups, acyl groups, esters, pegylations and the like.

The term "about" or "approximately" or "substantially unchanged" are defined as being close to as understood by one of ordinary skill in the art, and in one non-limiting embodiment the terms are defined to be within 10%, preferably within 5%, more preferably within 1%, and most preferably within 0.5%.

The use of the word "a" or "an" when used in conjunction with the term "comprising" in the claims and/or the specification may mean "one," but it is also consistent with the meaning of "one or more," "at least one," and "one or more than one."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The compositions and methods for their use can "comprise," "consist essentially of," or "consist of" any of the ingredients or steps disclosed throughout the specification. With respect to the transitional phase "consisting essentially of," in one non-limiting aspect, a basic and novel characteristic of the compositions and methods disclosed in this specification includes the compositions' abilities to reduce or prevent delamination of a film laminate to a cast-polymerized lens.

Other objects, features and advantages of the present invention will become apparent from the following detailed description. It should be understood, however, that the detailed description and the examples, while indicating specific embodiments of the invention, are given by way of illustration only. Additionally, it is contemplated that changes and modifications within the spirit and scope of the invention will become apparent to those skilled in the art from this detailed description.

DETAILED DESCRIPTION

Various features and advantageous details are explained more fully with reference to the non-limiting embodiments that are illustrated in the accompanying drawings and detailed in the following description. It should be understood, however, that the detailed description and the specific examples, while indicating embodiments, are given by way of illustration only, and not by way of limitation. Various substitutions, modifications, additions, and/or rearrangements will be apparent to those of ordinary skill in the art from this disclosure.

In the following description, numerous specific details are provided to provide a thorough understanding of the disclosed embodiments. One of ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
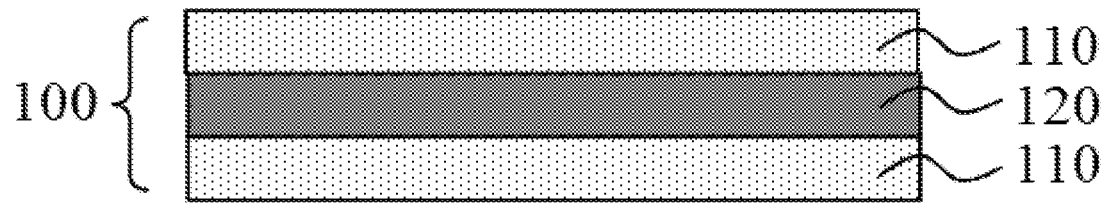
FIG. 1 is a side view of a polarizing laminate.
Figure 2:
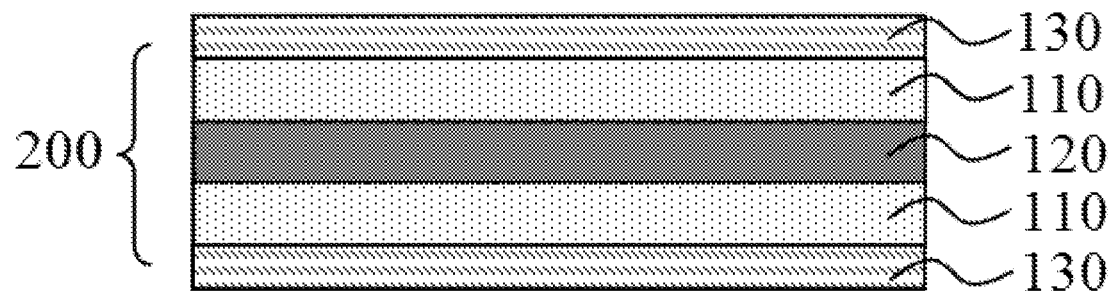
FIG. 2 is a side view of a polarizing laminate that has an adhesion-promoting primer applied.

In FIG. 1, a polarizing laminate (100) can be made by the lamination of a support or protective layers (110) onto a PVA polarizing film (120). The support layers (110) can be the same material or different materials. The support or protective layer (110) may be TAC. In FIG. 2, a primer (130) may be applied onto a TAC polar laminate (100) by flow coating, spin coating, gravure coating, or other means known to those of skill in the art.

The primer is comprised of three main ingredients, a base primer supplied by Onbitt, a monomer and an additional solvent. The base primer components include about 10-23% of an acrylic resin, about 10-23% of a UV curable urethane acrylate oligomer, about 65-66% methyl isobutyl ketone (MIBK) solvent and about 1-2% of a photoinitiator. The monomer is CR39 and the additional solvent is ethyl acetate.

In some aspects, the primer coating (130) may be dried from about 15 seconds to about 2 minutes at a temperature ranging from about 60° C. to about 80° C. Other drying conditions known to those of skill in the art may be employed to remove the solvent.

The primer (130) is cured, for example, by using heat or a UV light source depending upon the initiator being used. Cure conditions can also be developed using existing installed commercial systems.

Figure 3:
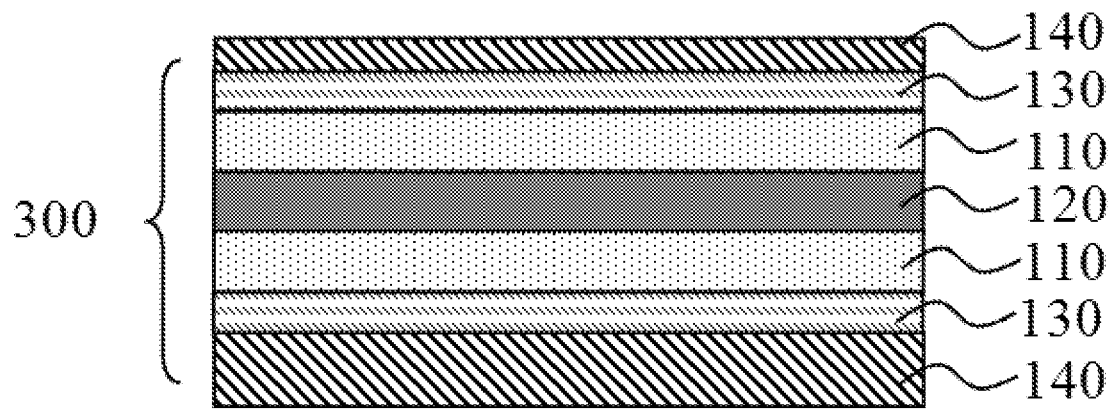
FIG. 3 is a side view of a cast polarizing lens.

In FIG. 3, the cured primed TAC polarizing laminate (200) was cast in CR39 (140). A semi-finished single vision (SFSV) lens (300) was aggressively surfaced (SET test, described below) then examined for delamination of the polarizing element within the lens.

Delamination Aggressive Surfacing and Edging Test (Set)

In the experiments described below, the surfacing and edging test is employed to induce stress potentially leading to delamination in various lens samples.

The surfacing and edging test is applicable to all ophthalmic lenses with embedded or surface mounted film. Lenses may be coated or uncoated, and may or may not include at least one of a hard coat, an antireflective component, a finishing vacuum coating, and a top coat. The observed failure rates provide an indication of the risk of failures during lens processing.

Lenses are generated with a power offset. The lenses are then fined with increased pressure to exert mechanical forces on lens edges, resulting in high stress at the interfaces, potentially weakening the adhesion. Polishing is performed in a typical manner known to one skilled in the art. Edging is performed with the most aggressive setting on a typical edger.

The test results outlined below were performed on polarized CR39 single vision lenses. The lenses were processed to +0.50 power with target thickness 2.8 mm. Lenses were blocked with metal alloy at an offset 0.1 diopter between the generator and the fining back curve. The fining pressure was raised to the safe maximum limits of the equipment (25 PSI, Gerber-Coburn). Polishing was performed according to standard operating procedures. Edging was performed on a fast-cycle edger which is selected to be especially aggressive (Triumph edger).

Inspection

A visual inspection for any anomalies resulting from any of the preceding steps is performed for each lens. Lenses are visually inspected for delamination. Any delamination is interpreted as a lens failure.

Base Primer

In developing a primer for improved adhesion of a TAC polar laminate to a cast CR39 lens, a base primer supplied by Onbitt was used as a starting point/control. The base primer components include about 10-23% of an acrylic resin which is chosen from Elvacite 2550 (methacrylate copolymer), Elvacite 2669 (acrylic copolymer) and Elvacite 2776 (acrylic resin) having a molecular weight range of 10,000 to 100,000 g/mol, about 10-23% of a UV-curable urethane acrylate oligomer (Nippon Gohsei UV-3000B), about 65-66% MIBK solvent, and about 1-2% of a photoinitiator (Irgacure 184).

The base primer was applied onto a TAC polarizing laminate, dried, UV cured then cast in CR39 to make a lens. The base primer did not provide adequate SET adhesion for manufacturing polarizing CR39 ophthalmic lenses. One drawback of the base primer is its softness. When applied onto TAC or TAC laminate then dried and UV cured, the base primer failed cross-hatch adhesion tests. The base primer was then diluted in MIBK solvent to approximately 10% w/w. The diluted base primer was applied onto TAC at about 1 µm. The diluted base primer now provided satisfactory cross-hatch adhesion results, but failed SET adhesion tests in cast CR39. When a protective liner was applied onto a primed TAC polarizing laminate then removed, the TAC exhibited glossy regions (TAC) and hazy regions (primer). This was a result of the protective liner removing the primer from the TAC polarizing laminate.

In additional tests, the base primer was applied onto Island Pyrochemical Industries (IPI) TAC polarizing laminate (polyurethane laminating adhesive) at a thickness of about 0.5-1.0 µm and cured in CR39. The base primer on the IPI polarizing laminate failed SET adhesion testing. The base primer was applied onto a LOFO TAC polarizing laminate with better SET results, however, the primer did not perform consistently. The base primer is used as a control.

Example 1

A new primer formulation was developed by improving upon the Onbitt base primer. Some base primer was weighed out into a container. Ethyl acetate solvent and CR39 monomer (reactive monomer) were added and the resulting mixture was mixed thoroughly The primer may be applied onto a TAC polar laminate by flow coating, spin coating, gravure coating, or other means known to those of skill in the art. In some aspects, the primer coating may be dried from about 15 seconds to about 2 minutes at a temperature ranging from about 60° C. to about 80° C. Other drying conditions known to those of skill in the art may be employed to remove the solvent. After drying, the primer is cured, for example, by using a UV light source. One exemplary, non-limiting UV light source is a Fusion H+ bulb. Power, energy, and exposure time may be selected to optimize curing. Typical, non-limiting curing conditions include about 7 feet/min (UVA ~1500 mJ/cm2, ~1200 mW/cm2) to about 21 feet/min (500 mJ/cm2, 1100 mW/cm2).

The primed TAC polarizing laminate was cast in CR39. The semi-finished single vision (SFSV) lens was aggressively surfaced (SET test described above) then examined for delamination of the polarizing element within the lens.

Example 2

Example 2 included the same base primer and monomer as Example 1. Cyclopentanone was used as the solvent.

Example 3

Example 3 included the same base primer and monomer as Example 1. Cyclohexanone was used as the solvent.

Comparative Example 1

Comparative Example 1 is a dilution of the base primer using ethyl acetate. No reactive monomer was added.

Comparative Example 2

Comparative Example 1 is a dilution of the base primer using MIBK solvent. No reactive monomer was added.

Comparative Example 3

Comparative Example 3 included the same base primer and monomer as Example 1. MIBK was used as the solvent.

Results

As shown in Table 1, SET adhesion was obtained when the base primer was diluted with ethyl acetate (Ex. 1), cyclopentanone (Ex. 2) or cyclohexanone (Ex. 3) in combination with the addition of allyl diglycol carbonate. Poor SET adhesion was observed with neat base primer, or with the base primer diluted only with ethyl acetate (Comp. Ex. 1) or MIBK (Comp. Ex. 2). Poor SET adhesion was also observed with base primer diluted with MIBK in combination with CR39 monomer (allyl diglycol carbonate, Comp. Ex. 3).

TABLE 1

Primer Formulations SET Adhesion

| Component | Ex. 1 | Ex. 2 | Ex. 3 | Base Primer | Comp. Ex. 1 | Comp. Ex. 2 | Comp. Ex. 3 |
|---|---|---|---|---|---|---|---|
| Base primer | 33.3% | 33.3% | 33.3% | 100% | 33.3% | 33.3% | 33.3% |
| Ethyl Acetate | 64.7% | | | | 66.7% | | |
| MIBK | | | | | | 66.7% | 64.7% |
| Cyclopentanone | | 64.7% | | | | | |
| Cyclohexanone | | | 64.7% | | | | |
| CR39 monomer | 2.0% | 2.0% | 2.0% | | | | 2.0% |
| SET Adhesion | excellent | good | good | poor | poor | poor | poor |

Table 2 includes examples of other laminates using various types of TAC. These were primed using the formula of Example 1, cast in CR39, then surfaced and edged as per SET. In all instances, the inventive primer passed SET adhesion. The primer disclosed herein perform successfully on laminates made from a variety TAC types.

TABLE 2

Utility - SET Adhesion Observed For or a Variety of TAC Laminates

| TAC Laminate | TAC Type | Haze | Laminate Thickness | SET Adhesion |
|---|---|---|---|---|
| LOFO | 915 Non-UV/LH | <0.5% | 200 μm | Pass |
| LOFO 80 μm | P905 | <1% | 200 μm | Pass |
| LOFO 190 μm | P916190 NonUV-LH | <0.4% | 400 μm | Pass |
| IPI 190 μm | 11SG190UV400-LH | <0.5% | 400 μm | Pass |
| IPI 180 μm | 11SG180UV400 < SNT | 10% <0.5% | 400 μm | Pass |
| IPI 190 μm | 190 non-UV | <1% | 400 μm | Pass |
| IPI 80 μm | 11SG80UV380-LH | <0.4% | 200 μm | Pass |
| IPI 80 μm | 11SG80UV-LH | <0.5% | 200 μm | Pass |
| IPI 80 μm | 11SG80S-LH non-UV | <0.4% | 200 μm | Pass |

The presently disclosed primer formulations, provide improved adhesion on TAC laminates, and are contemplated as a general TAC laminate adhesion-enhancing primer. The claims are not to be interpreted as including means-plus- or step-plus-function limitations, unless such a limitation is explicitly recited in a given claim using the phrase(s) "means for" or "step for," respectively.

The invention claimed is:

1. An ophthalmic lens comprising:
   a cast-polymerized lens comprising at least one polymer formed from allyl diglycol carbonate,
   a functional laminate comprising a thermoplastic film layer attached to both sides of a functional layer wherein the functional laminate is a triacetyl cellulose (TAC)-polyvinyl alcohol (PVA)-TAC laminate,
   a primer coating deposited onto both external surfaces of the functional laminate,
   wherein said primer coating comprises:
      33.3% of a base primer comprising:
         10-23% of an acrylic resin,
         10-23% of a UV-curable urethane acrylate oligomer,
         65-66% of methyl isobutyl ketone, and
         1-2% of a photoinitiator;
      64.7% of an additional solvent chosen from ethyl acetate, cyclopentanone, and cyclohexanone; and
      2.0% of allyl diglycol carbonate.

2. The ophthalmic lens of claim 1, wherein the acrylic resin has a molecular weight ranging from about 10,000 to about 100,000 g/mol.

3. The ophthalmic lens of claim 1, wherein the urethane acrylate oligomer comprises an ethylenically unsaturated monomer having a degree of unsaturation of 1 or more.

4. The ophthalmic lens of claim 3, wherein the urethane acrylate oligomer comprises an ethylenically unsaturated monomer having a degree of unsaturation of 2.

5. The ophthalmic lens of claim 1, wherein the functional laminate is a polarizing laminate.

* * * * *